(12) United States Patent
Yan et al.

(10) Patent No.: US 8,341,187 B2
(45) Date of Patent: Dec. 25, 2012

(54) METHOD AND DEVICE FOR STORAGE

(75) Inventors: Zhiwei Yan, Beijing (CN); Mei Zhang, Beijing (CN); Wanlong Li, Beijing (CN); Yi Yi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/097,925

(22) Filed: Apr. 29, 2011

(65) Prior Publication Data

US 2011/0202571 A1 Aug. 18, 2011

Related U.S. Application Data

(63) Continuation of application No. PCT/CN2009/074454, filed on Oct. 14, 2009.

(30) Foreign Application Priority Data

Oct. 30, 2008 (CN) .......................... 2008 1 0175208

(51) Int. Cl.
G06F 17/30 (2006.01)
(52) U.S. Cl. ........................................ 707/791; 707/797
(58) Field of Classification Search .................. 707/791, 707/797
See application file for complete search history.

(56) References Cited

U.S. PATENT DOCUMENTS

| | | | |
|---|---|---|---|
| 5,557,786 A * | 9/1996 | Johnson, Jr. ........................... | 1/1 |
| 6,567,815 B1 | 5/2003 | Rubin et al. | |
| 6,941,314 B2 * | 9/2005 | Andreev et al. ........................ | 1/1 |
| 7,231,383 B2 * | 6/2007 | Andreev et al. ............... | 707/696 |
| 2003/0097605 A1 | 5/2003 | Sharma et al. | |
| 2003/0208495 A1* | 11/2003 | Andreev et al. ............... | 707/100 |
| 2006/0059196 A1* | 3/2006 | Sato et al. ................... | 707/104.1 |
| 2006/0106832 A1* | 5/2006 | Ben-Dyke et al. ............. | 707/100 |
| 2006/0253606 A1* | 11/2006 | Okuno ........................... | 709/238 |
| 2009/0125530 A1* | 5/2009 | Martinsson et al. ........... | 707/100 |

FOREIGN PATENT DOCUMENTS

| | | |
|---|---|---|
| CN | 1635494 A | 7/2005 |
| CN | 1955958 A | 5/2007 |
| CN | 101141389 A | 3/2008 |
| CN | 101388842 A | 3/2009 |
| EP | 0977128 A1 | 2/2000 |

OTHER PUBLICATIONS

International Search Report in corresponding PCT Application No. PCT/CN2009/074454 (Jan. 21, 2010).
Written Opinion of the International Searching Authority in corresponding PCT Application No. PCT/CN2009/074454 (Jan. 21, 2010).

* cited by examiner

Primary Examiner — Thanh-Ha Dang
(74) Attorney, Agent, or Firm — Leydig, Voit & Mayer, Ltd.

(57) ABSTRACT

A method and device for storage are provided in embodiments of the present invention. The method includes: acquiring a storage position of a table entry in a hierarchical binary tree that includes a first-part binary tree and second-part binary trees, wherein nodes of the first-part binary tree point to the second-part binary trees through pointers; and inserting the table entry to the hierarchical binary tree according to the storage position. In the embodiments of the present invention, the hierarchical binary tree structure with pointers is adopted to store table entry content, reducing the times of moving table entries and greatly improving the algorithm refresh rate.

6 Claims, 13 Drawing Sheets

METHOD AND DEVICE FOR STORAGE

CROSS-REFERENCE TO RELATED APPLICATIONS

This application is a continuation of International Application No. PCT/CN2009/074454, filed on Oct. 14, 2009, which claims priority to Chinese Patent Application No. 200810175208.1, filed on Oct. 30, 2008, both of which are hereby incorporated by reference in their entireties.

FIELD OF THE INVENTION

The present invention relates to communication technologies, and in particular, to a method and device for storage.

BACKGROUND OF THE INVENTION

The search algorithm is a key router technology. At the prophase, the Ternary Content Addressable Memory (TCAM) is adopted to store and forward table entries.

The range search algorithm is a mature common algorithm technology that adopts the ternary tree and binary tree data structures.

For table entries that adopt longest-match, each node of the ternary tree includes Key value information and mask length information. Through the Key value information and the mask length information, a table entry can be expressed as a range. For example, the table entry 1.1.1.1/24 indicates the range from 1.1.1.0 to 1.1.1.255. That is, all destination addresses within the range are matched to 1.1.1.1/24. In this way, a routing table entry with a mask is turned into a range indicated by two nodes Likewise, all routing table entries can be turned into a series of ranges, and the nodes within these ranges are stored in ordinary binary trees.

The conventional art adopts the Central Processing Unit (CPU) in the Field Programmable Gate Array (FPGA) to insert and delete the series of table entries. The preceding method, however, leads to a large number of read/write operations on the storage media. In certain cases, a large number of table entries need to be moved in order to search for idle space. In extreme cases, to insert a table entry, all existing table entries need to be moved. In random cases, when the capacity reaches a certain value, the search speed of the preceding method is slow. Thus, the preceding method cannot support a high refresh rate.

For table entries with different bit widths, the conventional art needs to implement strict restrictions on base addresses. For a table entry with 64 bits, the conventional art still adopts the 32-bit addressing. As the number of table entries increases, the base addresses multiply as follows:

Base addresses for table entries on Page0: 0, 1, 2, . . .
Base addresses for table entries on Page1: 2, 4, 6, . . .
Base addresses for table entries on Page2: 4, 8, 12, . . .
Base addresses for table entries on Page4: 8, 16, 24, . . .

Therefore, as the table capacity increases, a large number of table entries are moved inevitably. The larger the table capacity is, the more frequently all table entries are moved. Such a restriction complicates the table entry resource management. When certain specific base addresses are occupied by other table entries, the conventional art has strict restrictions on the base addresses of table entries with different bit widths. As a result, the capacity is greatly wasted. In addition, as the number of table entries increases, the base addresses multiply. This results in a large number of movement operations and increases the algorithm maintenance cost.

SUMMARY OF THE INVENTION

A method and device for storage are provided in embodiments of the present invention to reduce the times of moving table entries and improve the algorithm refresh rate.

To achieve the above objectives, a method for storage is provided in an embodiment of the present invention. The method includes:

acquiring a storage position of a table entry in a hierarchical binary tree that includes a first-part binary tree and second-part binary trees, wherein nodes of the first-part binary tree point to the second-part binary trees through pointers; and inserting the table entry to the hierarchical binary tree according to the storage position.

A device for storage is provided in another embodiment of the present invention. The device includes:

an acquiring module, configured to acquire a storage position of a table entry in a hierarchical binary tree that includes a first-part binary tree and second-part binary trees, wherein nodes of the first-part binary tree point to the second-part binary trees through pointers; and an inserting module, configured to insert the table entry to the hierarchical binary tree according to the storage position acquired by the acquiring module.

Compared with the conventional art, the present invention has the following advantages: The embodiments of the present invention acquire a storage position of a table entry in a hierarchical binary tree and inserts the table entry to the hierarchical binary tree according to the storage position. The nodes on a first-part binary tree of the hierarchical binary tree point to second-part binary trees through pointers. These embodiments of the present invention hierarchicalcan reduce the times of moving table entries and greatly improve the algorithm refresh rate by employing the hierarchical binary tree structure with pointers to store the table entries.

BRIEF DESCRIPTION OF THE DRAWINGS

To make the technical solution of the present invention clearer, the accompanying drawings for illustrating the embodiments of the present invention or the prior art are briefly described below. Apparently, the accompanying drawings are for the exemplary purpose only, and person having ordinary skill in the art can derive other drawings from such accompanying drawings without any creative effort.

DETAILED DESCRIPTION OF THE EMBODIMENTS

The technical solution under the present invention is elaborated below with reference to accompanying drawings. Evidently, the embodiments described below are for the exemplary purpose only, without covering all embodiments of the present invention. All the other embodiments obtained by those skilled in the art without creative work based on the embodiments of the present invention are protected by the present invention.

Figure 1:
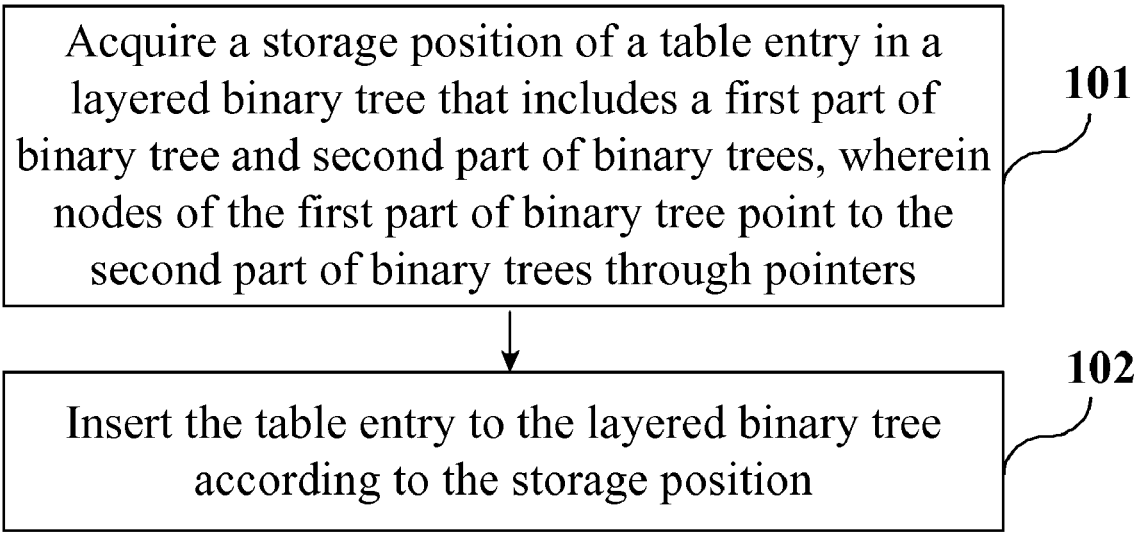
FIG. 1 is a flow chart of a method for storage in an embodiment of the present invention.

FIG. 1 is a flow chart of a method for storage in an embodiment of the present invention. The method includes:

Step 101: Acquiring a storage position of a table entry in a hierarchical binary tree that includes a first-part binary tree and second-part binary trees, wherein nodes of the first-part binary tree point to the second-part binary trees through pointers.

Step 102: Inserting the table entry to the hierarchical binary tree according to the storage position.

The process of inserting the table entry to the hierarchical binary tree may be:

allocating a node in the first-part binary tree and a second-part binary tree to a first table entry when inserting the first table entry to the hierarchical binary tree, wherein the allocated node in the first-part binary tree points to the allocated second-part binary tree through a pointer; and inserting table entries that need to be inserted to the corresponding second-part binary tree through the pointer when continuing to insert the table entries to the hierarchical binary tree. If the resources of the corresponding second-part binary tree are used up, other new second-part binary trees need be allocated to the table entries that need to be inserted.

When the node in the first-part binary tree corresponding to the second-part binary tree without available resources is an edge node, if an idle node exists near the edge node, two new second-part binary trees are allocated. Values of the second-part binary tree without available resources are divided into two parts, and the two parts are added to the two new second-part binary trees respectively. In addition, a value of the idle node is set to an intermediate value of the values of the second-part binary tree without available resources. The edge node and the idle node point respectively to the newly allocated two second-part binary trees through pointers.

When no idle node exists near the edge node, two consecutive nodes are searched for in the first-part binary tree, and two new second parts of binary tree are allocated. The values of the second-part binary tree without available resources are divided into two parts, and the two parts are added to the two new second-part binary trees respectively. Values of the two consecutive nodes in the first-part binary tree are set respectively to the value of the edge node and an intermediate value of the values of the second-part binary tree without available resources. The two consecutive nodes in the first-part binary tree point to the newly allocated two second parts of binary tree through pointers respectively.

When the node in the first-part binary tree corresponding to the second-part binary tree without available resources is an intermediate node in the first-part binary tree, if an idle node exists near the intermediate node, the nodes between the idle node and the intermediate node in the table where the intermediate node is located are moved one step toward the idle node in sequence, and the pointers of the nodes between the idle node and the intermediate node in the table where the intermediate node is located are moved accordingly in sequence so that the next node of the intermediate node is idle. Two new second-part binary trees are allocated. The values of the second-part binary tree without available resources are divided into two parts, and the two parts are added to the two new second parts of binary trees respectively. In addition, a value of the next node of the intermediate node is set to the intermediate value of the values of the second-part binary tree without available resources. The intermediate node and the next node of the intermediate node point to the two newly allocated second-part binary trees through pointers respectively.

When no idle node exists near the intermediate node, an area of consecutive nodes in the first-part binary tree is searched for. All nodes in the table where the intermediate node is located are moved to the area of consecutive nodes in the first-part binary tree. The pointers of all nodes in the table where the intermediate node is located are moved accordingly in sequence so that the intermediate node and the next node of the intermediate node after the movement are idle. Two new second-part binary trees are allocated. The values of the second-part binary tree without available resources are divided into two parts, and the two parts are added to the two new second-part binary trees respectively. In addition, the values of the intermediate node and the next node of the intermediate node are set to the value of this intermediate node and an intermediate value of the values of the second-part binary tree without available resources respectively. The intermediate node and the next node of the intermediate node point to the two newly allocated second-part binary trees through pointers respectively.

The preceding method for storage acquires a storage position of a table entry in a hierarchical binary tree, and inserts the table entry to the hierarchical binary tree according to the storage position. The nodes in the first-part binary tree of the hierarchical binary tree point to the second-part binary trees through pointers. In this embodiment of the present invention, a hierarchical binary tree structure with pointers is adopted to store table entries, reducing the times of moving table entries and greatly improving the algorithm refresh rate.

Figure 2:
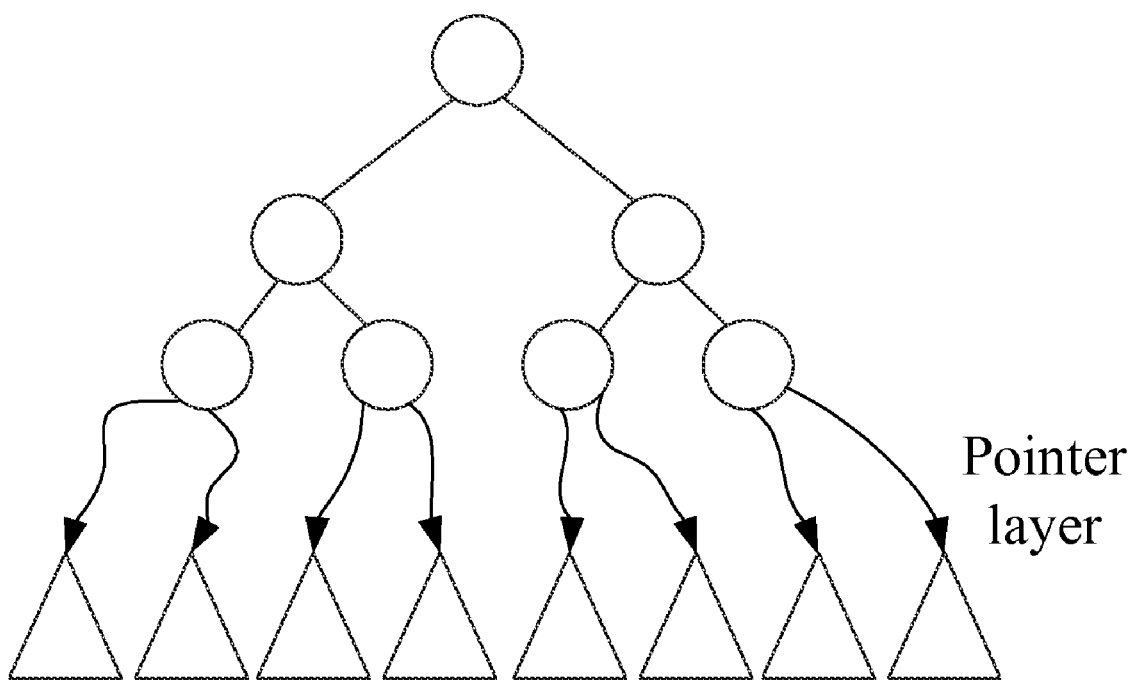
FIG. 2 shows a structure of a pointer-based hierarchical binary tree in an embodiment of the present invention.

FIG. 2 shows a structure of a pointer-based hierarchical binary tree in an embodiment of the present invention. As shown in FIG. 2, a hierarchical binary tree indicates a complete binary tree split at a certain layer. The first-part the split binary tree is a complete binary tree. The second-part the split binary tree includes multiple small binary trees. Nodes in the first-part binary tree are connected to the small binary trees in the second part through pointers.

Both the first part and the second-part the hierarchical binary tree are ordinary binary trees. Table entries are searched for from the first part to the second part by using pointers. A node in the first-part binary tree may point to any small binary tree in the second part by a pointer. With the help of pointers, the small binary trees in the second part are not fixedly connected to the nodes in the first-part binary tree. The pointers determine the nodes in the first-part binary tree that the small binary trees in the second part are connected to. A complete hierarchical binary tree structure is saved in the memory. Therefore, the insertion, deletion, movement, and idle position search are implemented by the CPU, greatly reducing the read operation time. In addition, the CPU facilitates subsequent algorithm extension.

In terms of resource management, the area of each table entry does not need to be fixed at the initiation stage when there is no table entry in an embodiment of the present invention. The quantity of table entries in a table starts from zero. When the number of table entries in a certain table is zero, the resources occupied by the table are zero. When a first table entry is inserted, the first table entry is allocated with a node in the first-part binary tree and a small binary tree of the second part, and the node in the first-part binary tree points to the corresponding small binary tree of the second part through a pointer.

When a subsequent table entry is inserted, the table entry is inserted to the corresponding small binary tree through the pointer. If the small binary tree has room, only the nodes inside the small binary tree need to be moved. The table entry is inserted to a node in the corresponding small binary tree. If resources of the small binary tree are insufficient, a new small binary tree needs to be allocated. If the node in the first-part binary tree corresponding to a small binary tree without available resources is an edge node in the first-part binary tree, the following modes may be adopted.

Mode 1: If an idle node exists near the edge node, the first-part binary tree can be extended around the edge node. Two new small binary trees are allocated. Values of the small binary tree without available resources are divided into two parts, and the two parts are added to the two new small binary trees respectively. In addition, a value of the idle node is set to an intermediate value of the values of the small binary tree without available resources. Then, the edge node and the idle node near the edge node point to the new small binary trees through pointers respectively.

FIG. 3(a) and FIG. 3(b) show an extension schematic diagram of a small binary tree in an embodiment of the present invention. Specifically, in FIG. 3(a), a node 3 in the first-part binary tree points to a small binary tree 1; resources of the small binary tree 1 are used up, and new small binary trees need to be allocated. Further, in FIG. 3(b), an idle node 4 exists near the node 3 in the first-part binary tree. Therefore, two new small binary trees 2 and 3 are allocated. Values of the small binary tree 1 are divided into two parts, and the two parts are added to the small binary tree 2 and the small binary tree 3 respectively, and a value of the idle node 4 is set to an intermediate value of the values of the small binary tree 1. Then, the node 3 in the first-part binary tree points to the small binary tree 2 through a pointer, and the node 4 in the first-part binary tree points to the small binary tree 3 through another pointer.

Figure 3:
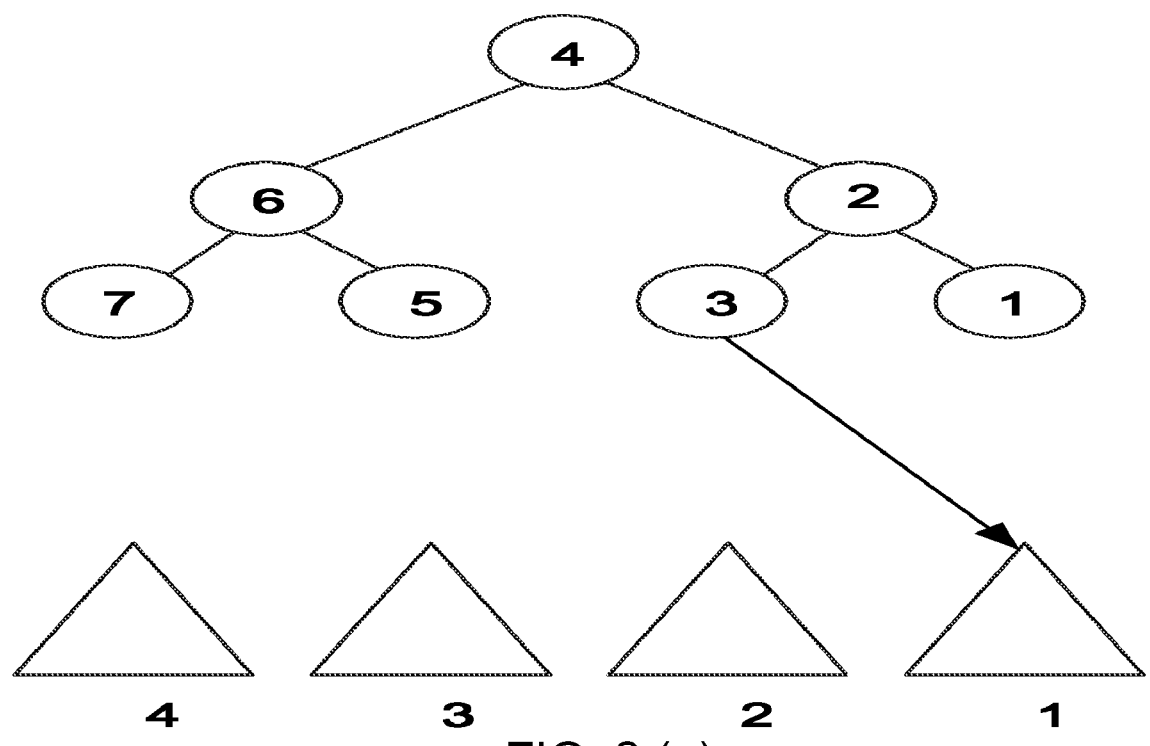
FIG. 3(a) and FIG. 3(b) show a schematic diagram of an extension of a small binary tree in an embodiment of the present invention.
Figure 3:
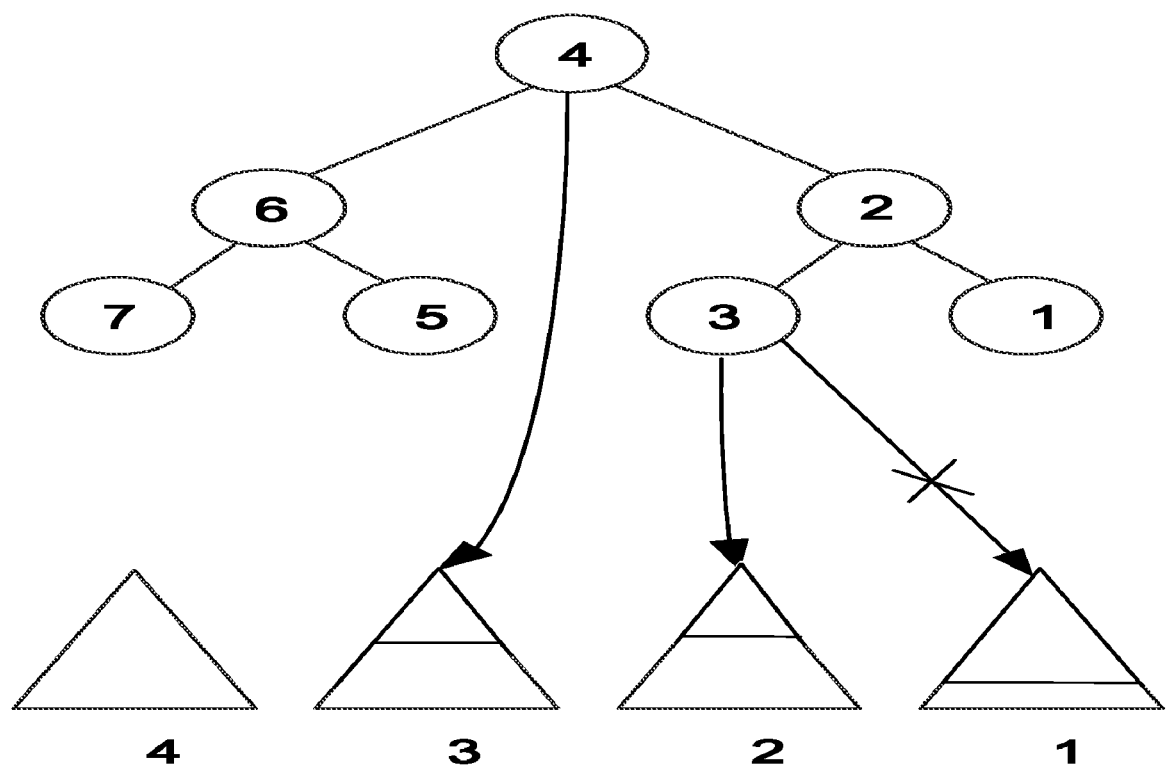

When the capacity of the two small binary trees for storing table entries reduces to a preset value, the table entries in the two small binary trees can be combined, and the corresponding nodes of the table entries in the two small binary trees are deleted. The operation of deleting a node is mutually converse to the operation of inserting a node. Take FIG. 3 for example. When the number of the table entries corresponding to the small binary tree 2 and the small binary tree 3 is reduced to a preset value, values of the small binary tree 2 and the small binary tree 3 are combined and stored in the small binary tree 1. The pointer of the node 4 in the first-part binary tree is deleted. The node 3 in the first-part binary tree points to the small binary tree 1 through a pointer. The final storage result is as shown in FIG. 3(a).

In this embodiment of the present invention, after a node is deleted, information about the deleted node is collected to facilitate resource management. Idle nodes are searched for subsequently according to resource management.

Mode 2: If no idle node exists near the edge node, two consecutive nodes may be searched for in the first-part binary tree, and two new small binary trees need to be allocated. The values of the small binary tree without available resources are divided into two parts respectively, and the two parts are added to the two new small binary trees respectively. The values of the two consecutive nodes found in the first-part binary tree are set to the value of the edge node and an intermediate value of the values of the small binary tree without available resources respectively. Then, the two consecutive nodes found in the first-part binary tree point to the newly allocated small binary trees through pointers respectively.

Figure 4:
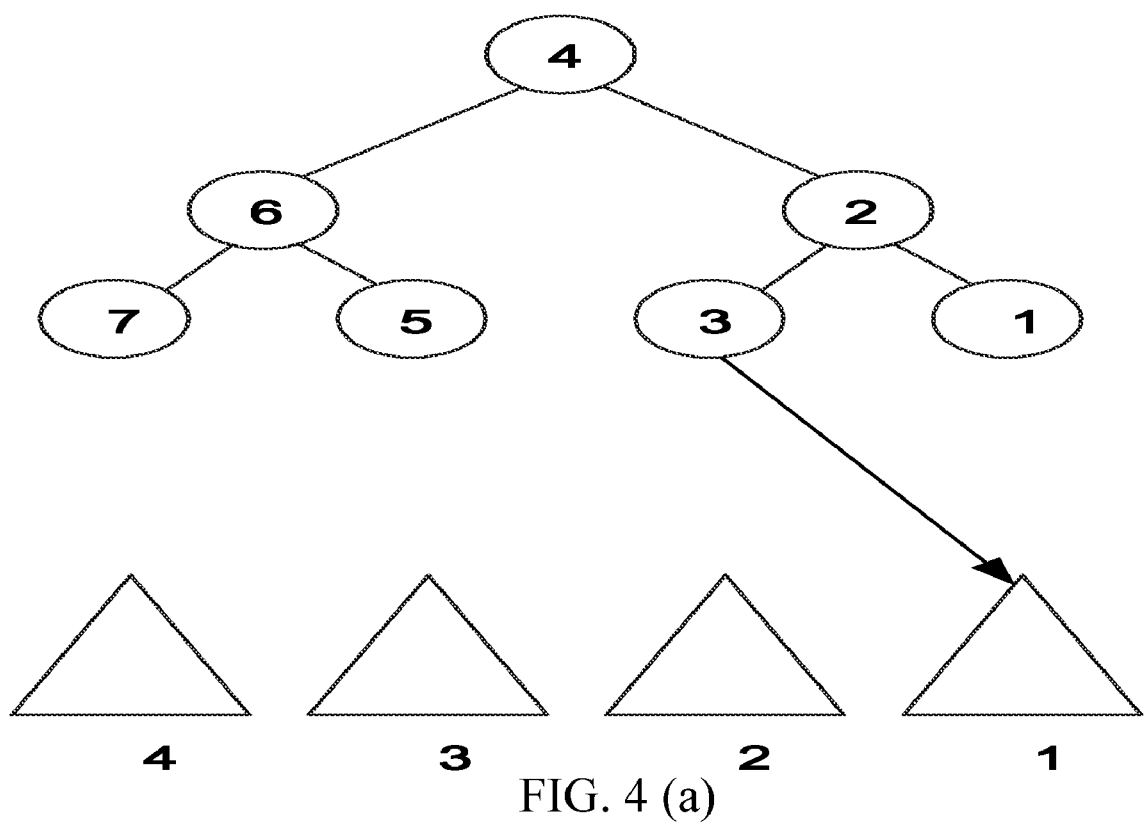
FIG. 4(a) and FIG. 4(b) show a schematic diagram of another extension of a small binary tree in an embodiment of the present invention.
Figure 4:
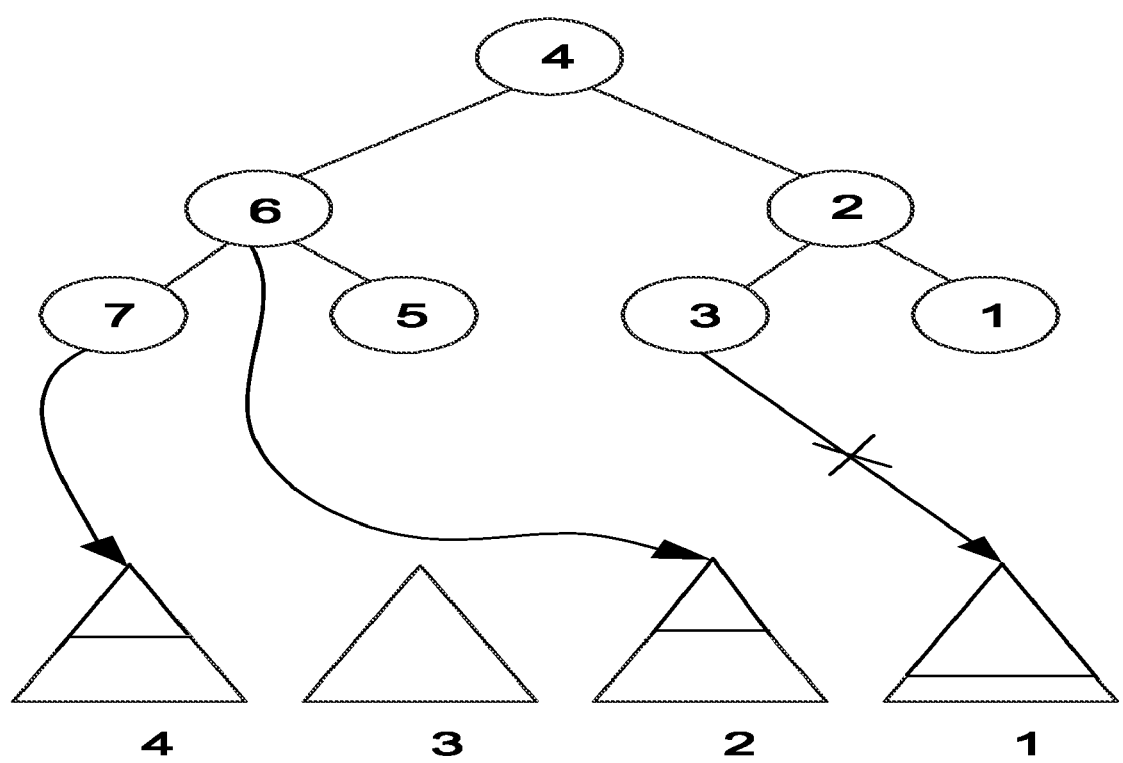

FIG. 4(a) and FIG. 4(b) show another extension schematic diagram of a small binary tree in an embodiment of the present invention. Specifically, in FIG. 4(a), a node 3 in the first-part binary tree points to a small binary tree 1; resources of the small binary tree 1 are used up, and new small binary trees need to be allocated. Further, in FIG. 4(b), no idle node exists near the node 3 in the first-part binary tree. Therefore, two consecutive nodes 6 and 7 are searched for in the first-part binary tree. In addition, two new small binary trees 2 and 4 are allocated. Values of the small binary tree 1 are divided into two parts, and the two parts are added to the two new small binary trees 2 and 4 respectively. Values of the two consecutive nodes 6 and 7 are set to the value of the node 3 in the first-part binary tree and an intermediate value of the values of the small binary tree 1 respectively. Then, the node 6 in the first-part binary tree points to the small binary tree 2 through a pointer, and the node 7 in the first-part binary tree points to the small binary tree 4 through another pointer.

As the number of table entries increases, the allocated binary tree resources increase. To ensure continuity of search, the sequence numbers of the nodes in the first-part binary tree for a same table are consecutive preferably. The numbers of small binary trees in the second part do not need to be consecutive. During table entry insertion, when the table entry resources of the small binary tree corresponding to an intermediate node in the first-part binary tree are used up, and the values of the small binary tree need to be divided, the following methods may be adopted.

Method 1: When an idle node exists near the intermediate node, the nodes between the intermediate node and the idle node are moved one step to the direction of the idle node in sequence, and the corresponding pointers are moved accordingly so that the next node of the intermediate node is idle. Then, two new small binary trees are allocated. The values of the small binary tree without available resources are divided into two parts, and the two parts are added to the two new small binary trees respectively. The value of the next node of the intermediate node is set to an intermediate value of the values of the small binary tree without available resources. The intermediate node and the next node of the intermediate node point to the two newly allocated small binary trees through pointers respectively. At last, the intermediate node and the next node of the intermediate node point to the two newly allocated small binary trees through pointers respectively.

FIG. 5(a), FIG. 5(b), and FIG. 5(c) show a third extension of a small binary tree in an embodiment of the present invention. Specifically, in FIG. 5(a) a node 5 in the first-part binary tree points to a small binary tree 34. If resources of the small binary tree 34 are used up, and a node 8 in the first-part binary tree is idle. Please see FIG. 5(b), the node 8 in the first-part binary tree points to a small binary tree 28 through a pointer; the node 7 in the first-part binary tree points to the small binary tree 2 through a pointer; the node 6 in the first-part binary tree points to the small binary tree 2 through a pointer, and therefore, the node 6 in the first-part binary tree is made idle. In FIG. 5(c), two new small binary trees 4 and 19 are allocated; the values of the small binary tree 34 are divided into two parts, and the two parts are respectively stored in the new small binary trees 4 and 19; the value of the node 6 in the first-part binary tree is set to an intermediate value of the values of the small binary tree 34; the node 5 in the first-part binary tree points to the small binary tree 19 through a pointer, and the node 6 in the first-part binary tree points to the small binary tree 4 through a pointer.

Figure 5:
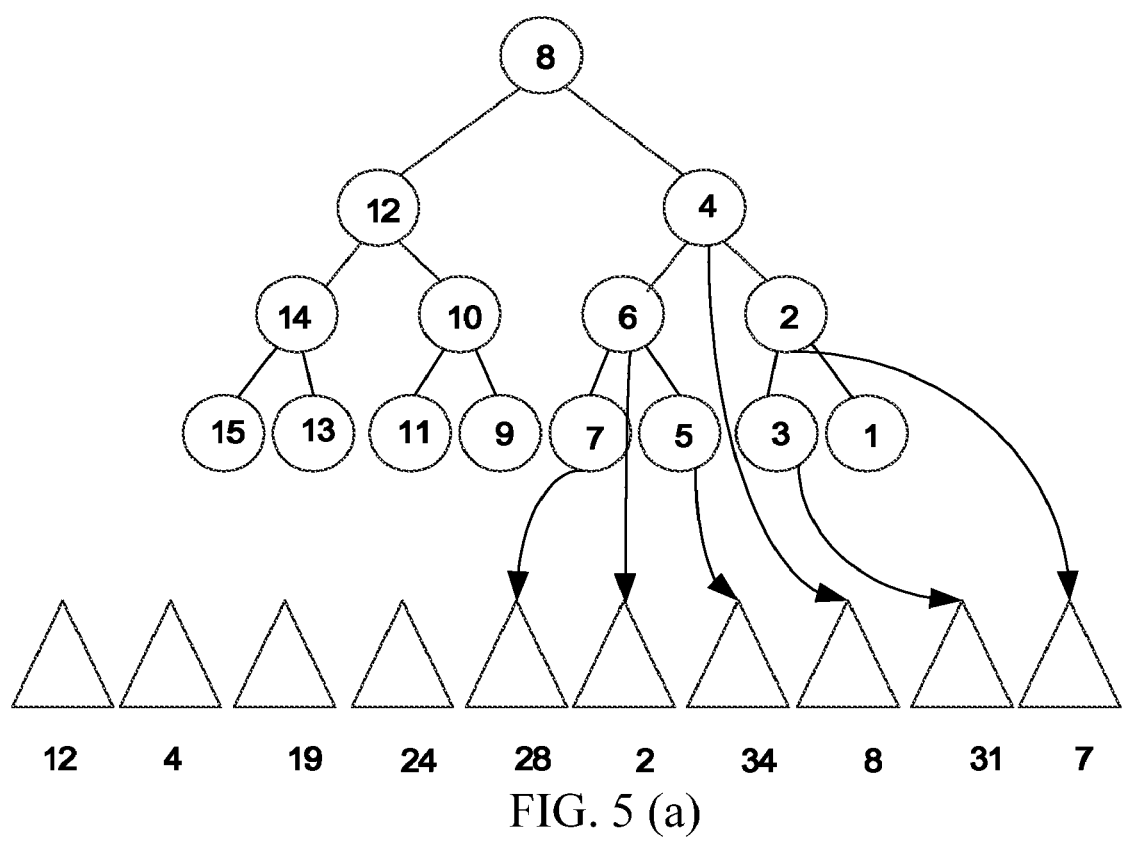
FIG. 5(a), FIG. 5(b), and FIG. 5(c) show a schematic diagram of a third extension of a small binary tree in an embodiment of the present invention.
Figure 5:
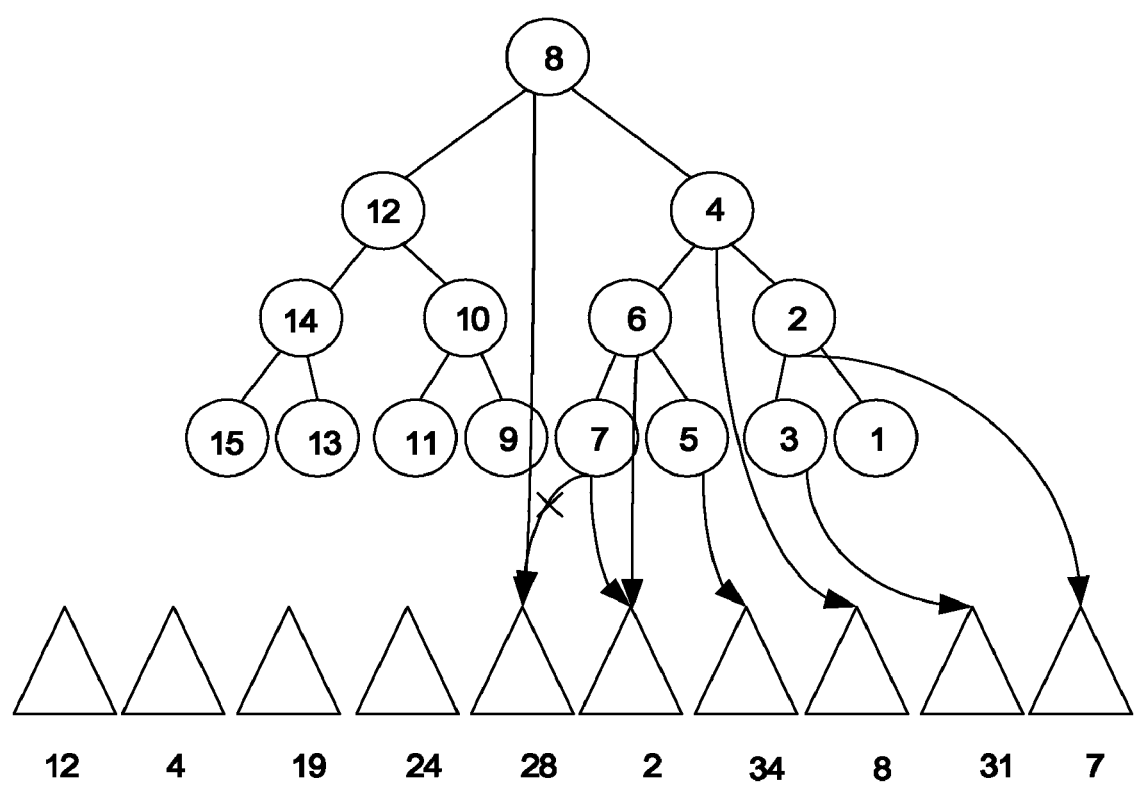
Figure 5:
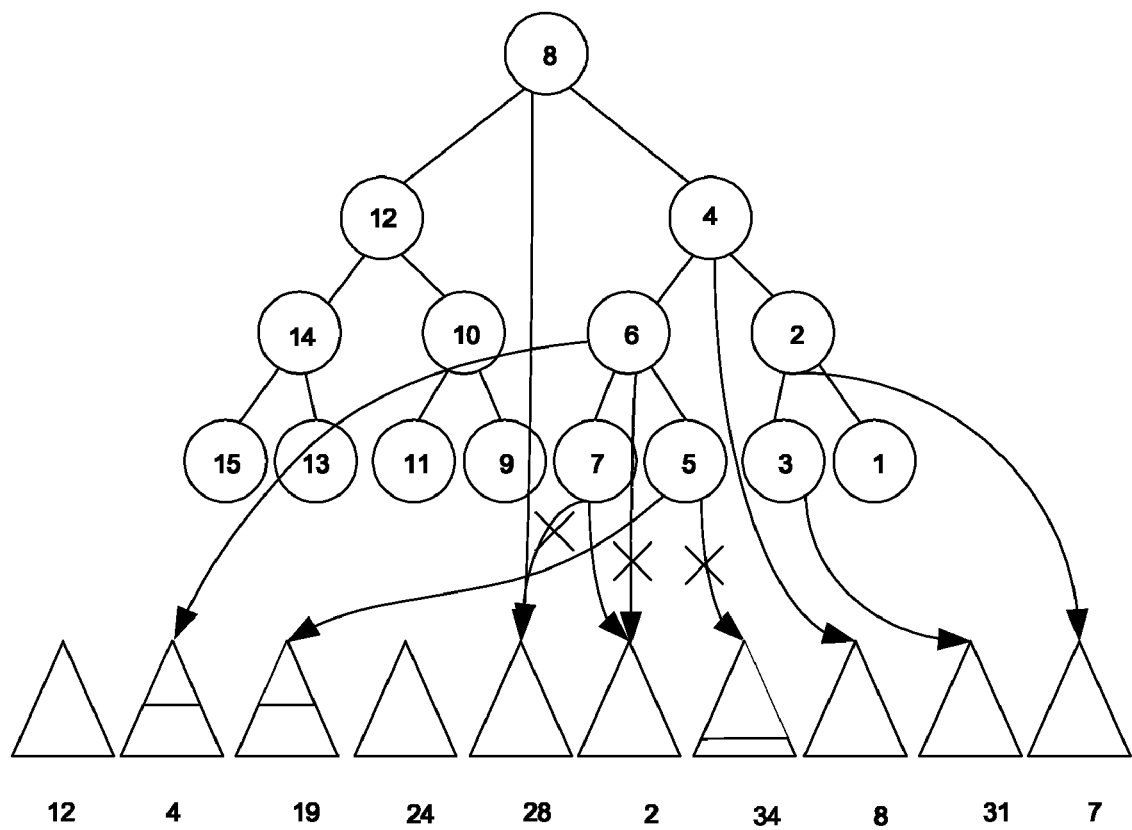

As shown in FIG. 5(*a*) to FIG. 5(*c*), when a small binary tree cannot store more table entries, the nodes in the first-part binary tree may be moved in sequence, and the values of the small binary tree without available resources are divided into two parts, and the two parts are respectively stored in two new small binary trees. In this case, the write operation is rarely used. This is the reason why the hierarchical binary tree structure eliminates most movement operations.

Likewise, when the capacity of the two small binary trees for storing table entries reduces to a preset value, the table entries in the two small binary trees can be combined, and the corresponding nodes of the table entries in the two small binary trees are deleted. The operation of deleting a node is mutually converse to the operation of inserting a node. Take FIG. 5(*c*) for example. When the number of the table entries corresponding to the small binary tree 4 and the small binary tree 19 is reduced to a preset value, the values of the small binary tree 4 and the small binary tree 19 are combined and stored in the small binary tree 34. The pointer of the node 8 in the first-part binary tree is deleted. The node 7 in the first-part binary tree points to the small binary tree 28 through a pointer. The node 6 in the first-part binary tree points to the small binary tree 2 through a pointer. The node 5 in the first-part binary tree points to the small binary tree 34 through a pointer. The final storage result is as shown in FIG. 5(*a*).

In this embodiment of the present invention, after a node is deleted, information about the deleted node is collected to facilitate resource management. Idle nodes are searched for subsequently according to resource management.

Method 2: When no idle node exists near the intermediate node, an area of consecutive binary tree nodes is searched for. The intermediate node and nodes adjacent to the intermediate node are moved to the binary tree area. The pointers of all nodes in the table where the intermediate node is located are moved accordingly in sequence so that the intermediate node and the next node of the intermediate node after the movement are idle. Two new second-part binary trees are allocated. The values of the second-part binary tree without available resources are divided into two parts, and the two parts are added to the two new second-part binary trees respectively. In addition, the values of the intermediate node and the next node of the intermediate node are set to the value of this intermediate node and an intermediate value of the values of the second-part binary tree without available resources respectively. The intermediate node and the next node of the intermediate node point to the two newly allocated second-part binary trees through pointers respectively.

Figure 6:
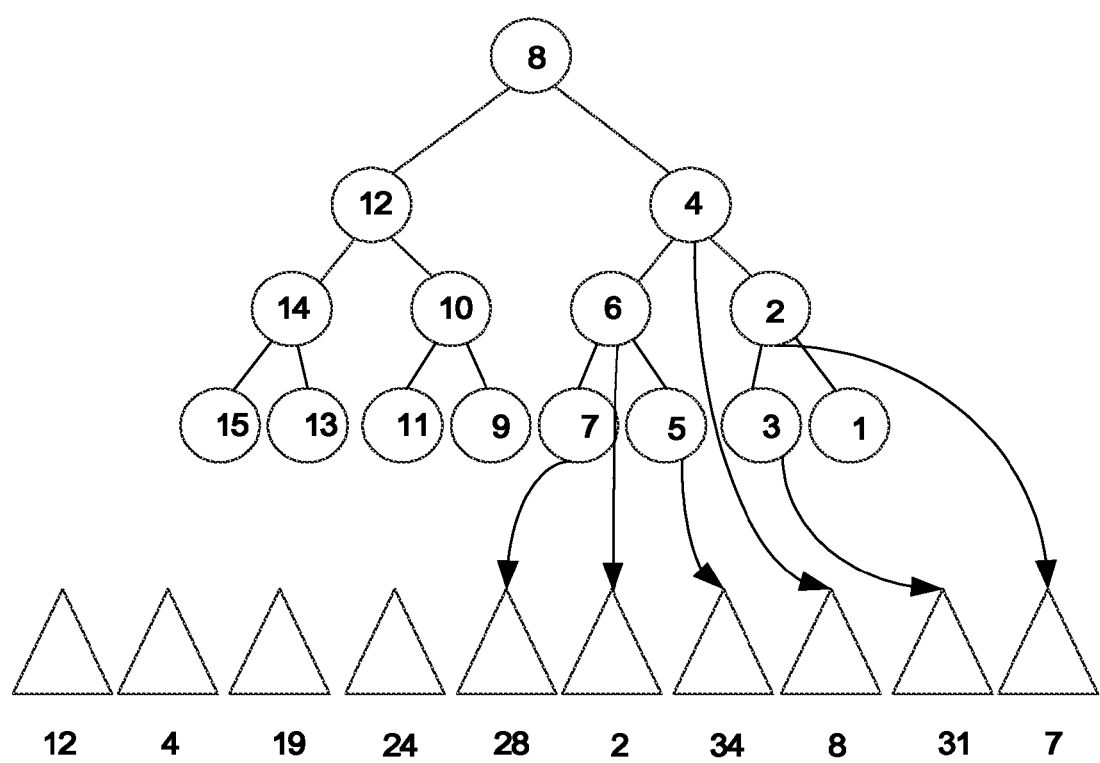
FIG. 6(a) and FIG. 6(b) show a schematic diagram of a fourth extension of a small binary tree in an embodiment of the present invention.
Figure 6:
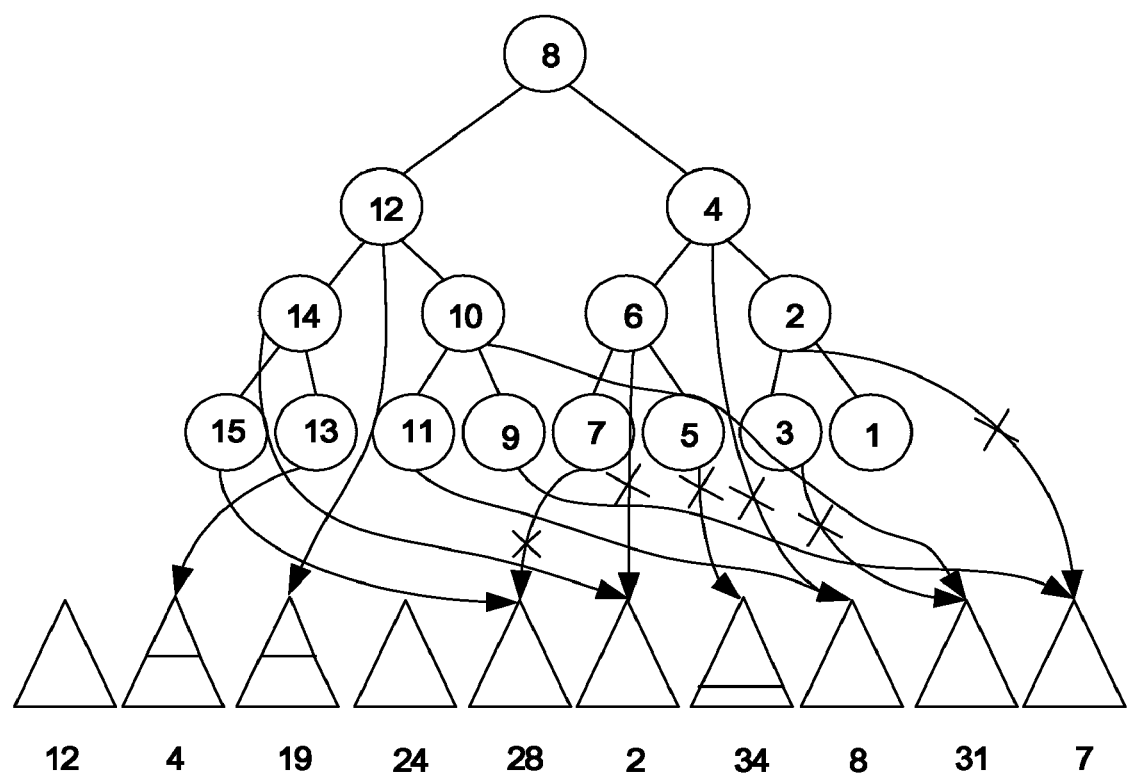

FIG. 6(*a*) and FIG. 6(*b*) show another extension of a small binary tree in an embodiment of the present invention. Specifically, in FIG. 6(*a*), a node 5 in the first-part binary tree points to a small binary tree 34; resources of the small binary tree 34 are used up, and no idle node exists near the node 5 in the first-part binary tree. In FIG. 6(*b*), an area of consecutive binary tree nodes 9, 10, 11, 12, 13, 14, and 15 is searched for adjacent nodes 1, 2, 3, 4, 5, 6, and 7 in the first-part binary tree. The node 5 in the first-part binary tree is moved accordingly to the nodes 12 and 13 in the first-part binary node in the consecutive binary tree nodes. Two new small binary trees 4 and 19 are allocated. The values of the small binary tree 34 are divided into two parts, and the two parts are stored in the small binary trees 4 and 19 respectively. The values of the nodes 12 and 13 in the first-part binary node are set to the value of the node 5 in the first-part binary tree and an intermediate value of the values of the small binary tree 34 respectively. The node 12 in the first-part binary tree points to the small binary tree 19 through a pointer, and the node 13 in the first-part binary tree points to the small binary tree 4 through a pointer.

In specific implementation of this embodiment of the present invention, the border value of the table corresponding to table entries is changed according to the change of the number of table entries.

At the initiation stage of implementing this embodiment of the present invention, no fixed resources are allocated to table entries. Resources are dynamically applied for according to the change of the number of table entries. The resources are allocated to the first-part binary tree and the second-part binary trees. In this way, resources are dynamically shared. In a certain application scenario, when the capacity of a certain table entry is great, sufficient resources are allocated to the table entry. Therefore, the dynamic sharing of resources increases the flexibility of resource allocation, and meets the requirements of applications in all scenarios without restarting boards.

In this embodiment of the present invention, table entries with different bit widths adopt different numbering schemes, and the numbers of the table entries with different bit widths are corresponding to different binary tree nodes. The number of nodes occupied by a table entry varies with the bit width. In addition, the coding scheme for addresses varies. For example, a node in a table entry whose bit width is 64 bits occupies two 32-bit nodes. Therefore, it is not convenient to manage 64-bit table entries by adopting the sorting sequence for 32-bit table entries. Independent numbering schemes are adopted i.e. during table search, the 32-bit table entries and the 64-bit table entries adopt different numbering schemes. In numbering, the 32-bit table entries and the 64-bit table entries need not have overlapped binary tree nodes. That is, there is a border line between numbers of the 32-bit table entries and the 64-bit table entries. The border line is dynamically applied. When resources occupied by the 32-bit table entries are insufficient, the border line needs to move toward the direction of the 64-bit table entries. Similarly, when resources occupied by the 64-bit-wide table entries are insufficient, the border line needs to move toward the direction of the 32-bit-wide table entries.

Base addresses of table entries with different bit widths can change freely.

For table entries with the same bit width, the resource management mode based on page table and block table is adopted in this embodiment of the present invention to manage resources of multiple virtual private networks (VPNs). The page-table-based resource management mode allocates, aggregates, and recycles resources according to the exponent of 2. The advantages of this mode include simple management, small amount of movement, and reduction of resource waste through table entry compression. In this embodiment of the present invention, a block table is introduced to the page-table-based management mode. Page tables that exceed a specified size enter into the block table, and are allocated according to adding 1 or decreasing 1 operation. For a VPN with a small capacity, page tables are adopted to implement page management. For a VPN with a large capacity, block tables are adopted to implement block management.

In this embodiment of the present invention, the hierarchical binary tree structure with pointers is adopted to store table entry content, reducing the times of moving table entries and greatly improving the algorithm refresh rate. Flexible and dynamic table entry management and sharing of table entries with different bit widths provide more configuration options for operators without restarting boards.

Figure 7:
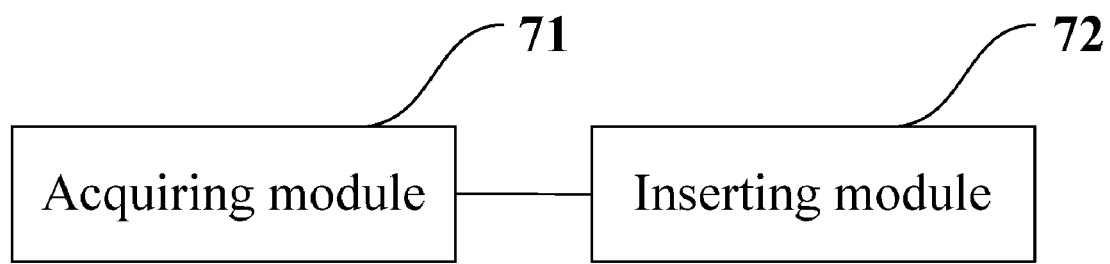
FIG. 7 shows a structure diagram of a device for storage in an embodiment of the present invention.

FIG. 7 shows a structure of a device for storage in an embodiment of the present invention. The device for storage includes:

an acquiring module 71, configured to acquire a storage position of a table entry in a hierarchical binary tree that includes a first-part binary tree and second-part binary trees, wherein nodes of the first-part binary tree point to the second-part binary trees through pointers; and an inserting module 72, configured to insert the table entry to the hierarchical binary tree according to the storage position acquired by the acquiring module 71.

Figure 8:
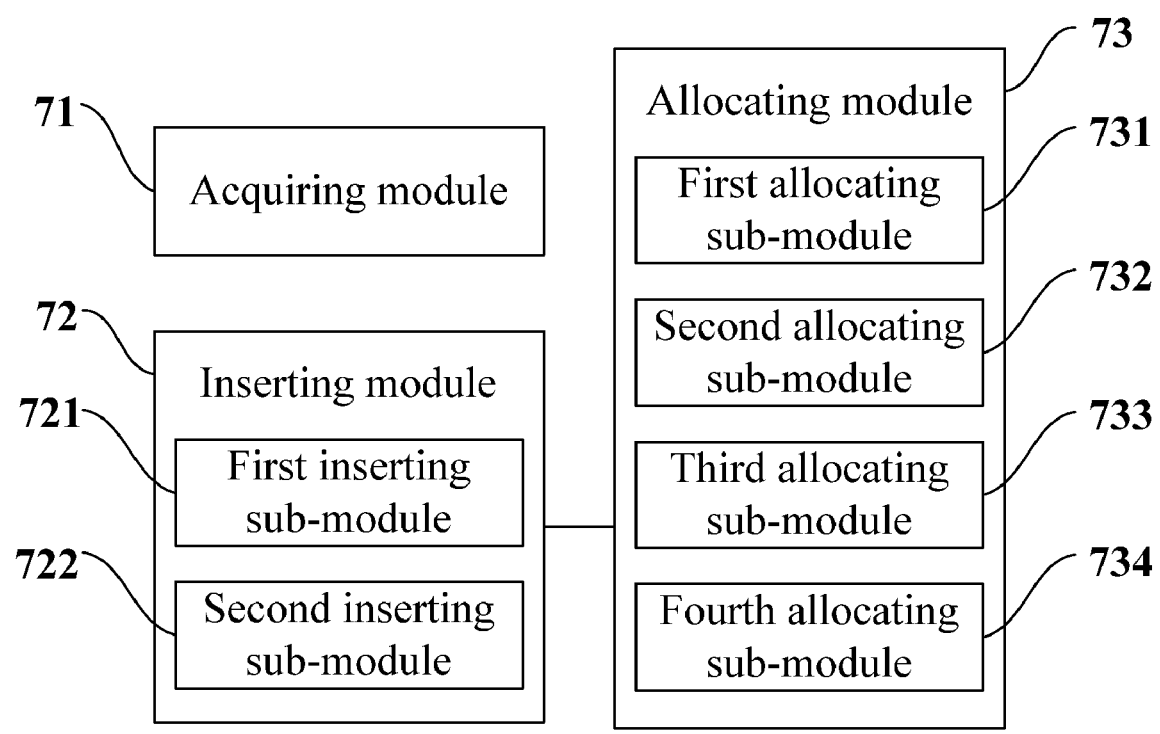
FIG. 8 shows a structure diagram of another device for storage in an embodiment of the present invention.

FIG. 8 shows a structure of another device for storage in an embodiment of the present invention, where the inserting module 72 may include:

a first inserting sub-module 721, configured to allocate a node in the first-part binary tree and a second-part binary tree to a first table entry when inserting the first table entry to the hierarchical binary tree, where the allocated node in the first-part binary tree points to the allocated second-part binary tree through a pointer; and a second inserting sub-module 722, configured to insert table entries that need to be inserted to the corresponding second-part binary tree through the pointer when continuing to insert the table entries to the hierarchical binary tree.

The device for storage may further include:

an allocating module 73, configured to allocate new second-part binary trees to a table entry that needs to be inserted when the resources of the corresponding second-part binary tree are used up.

The allocating module 73 may include:

a first allocating sub-module 731, configured to: allocate two new second-part binary trees when the node in the first-part binary tree corresponding to the second-part binary tree without available resources is an edge node and if an idle node exists near the edge node; divide the values of the second-part binary tree without available resources into two parts and add the two parts to the two new second-part binary trees respectively; set a value of the idle node to an intermediate value of the values of the second-part binary tree without available resources; and point the edge node and the idle node to the newly allocated two second-part binary trees through pointers respectively; and a second allocating sub-module 732, configured to: search the first-part binary tree for two consecutive nodes and allocate two new second-part binary trees when no idle node exists near the edge node; divide the values of the second-part binary tree without available resources into two parts and add the two parts to the two new second-part binary trees respectively; and set the values of the two consecutive nodes in the first-part binary tree to the value of the edge node and an intermediate value of the values of the second-part binary tree without available resources respectively, where the two consecutive nodes in the first-part binary tree point to the newly allocated two second-part binary trees through pointers respectively.

The allocating module 73 may include:

a third allocating sub-module 733, configured to: move the nodes between the idle node and the intermediate node in the table where the intermediate node is located one step toward the idle node in sequence, and move the pointers of the nodes between the idle node and the intermediate node in the table where the intermediate node is located accordingly in sequence when the node in the first-part binary tree corresponding to the second-part binary tree without available resources is an intermediate node in the first-part binary tree and if an idle node exists near the intermediate node, so that the next node of the intermediate node is idle; allocate two new second-part binary trees; divide the values of the second-part binary tree without available resources into two parts and add the two parts to the two new second-part binary trees respectively; set the value of the next node of the intermediate node to an intermediate value of the values of the second-part binary tree without available resources; and point the intermediate node and the next node of the intermediate node to the two newly allocated second-part binary trees through pointers respectively; and a fourth allocating sub-module 734, configured to: search for an area of consecutive nodes in the first-part binary tree when no idle node exists near the intermediate node; move all nodes in the table where the intermediate node is located to the area of consecutive nodes in the first-part binary tree; move the pointers of all nodes in the table where the intermediate node is located accordingly in sequence so that the intermediate node and the next node of the intermediate node after the movement are idle; allocate two new second-part binary trees; divide the values of the second-part binary tree without available resources into two parts and add the two parts to the two new second parts of binary tree respectively; and set the values of the intermediate node and the next node of the intermediate node to the value of this intermediate node and an intermediate value of the values of the second-part binary tree without available resources, where the intermediate node and the next node of the intermediate node point to the two newly allocated second-part binary trees through pointers respectively.

In the preceding device for storage, the inserting module 72 inserts table entries to the hierarchical binary tree, and stores table entries in the hierarchical binary tree to the storage medium. The first-part binary tree in the hierarchical binary tree points to the second-part binary tree through pointers. In the embodiment of the present invention, the hierarchical binary tree structure with pointers is adopted to store table entry content, reducing the times of moving table entries and greatly improving the algorithm refresh rate.

Through the description of the preceding implementation modes, those skilled in the art can clearly understand that the present invention can be implemented through hardware or through software with a necessary general hardware platform. Based on such understanding, the technical solution of the present invention may be embodied in the form of a software product. Such a software product may be stored in a non-volatile storage medium such as CD-ROM, memory disk, and mobile disk and include instructions that are configured to enable a computer device, such as a personal computer, a server, and a network device, to execute the methods provided in the preceding embodiments of the present invention.

Those skilled in the art can understand that the drawings are for an exemplary purpose. The modules or flows in the drawings are not necessarily required for implementing the present invention.

Those skilled in the art can understand that the modules of the device in the embodiment may be distributed in the device in the embodiment according to the description of the embodiment, or be changed and located in one or multiple devices different from the device in the present embodiment. The modules in the preceding embodiment may be combined into one module, or further split into multiple sub-modules.

The sequence numbers of the preceding embodiments of the present invention are merely for a description purpose but do not indicate the preference of the embodiments.

The preceding are several specific embodiments of the present invention. However, the present invention is not confined to these embodiments. All changes that can be made by those skilled in the art shall fall into the protection scope of the present invention.

What is claimed is:

1. A method for storing table entries, wherein the method is implemented by a central processing unit, comprising:
   acquiring a storage position of a table entry in a hierarchical binary tree that comprises a first-part binary tree and second-part binary trees, wherein nodes of the first-part binary tree point to the second-part binary trees through pointers; and
   inserting the table entry to the hierarchical binary tree according to the storage position;
   wherein before the inserting of the table entry to the hierarchical binary tree according to the storage position comprises:
      allocating a node in the first-part binary tree and allocating one of the second-part binary trees to a first table entry when inserting the first table entry to the hierarchical binary tree, wherein the allocated node in the first-part binary tree points to the allocated second-part binary tree through one of the pointers; and
      inserting table entries to the allocated second-part binary tree through the pointer when continuing to insert the table entries to the hierarchical binary tree according to the storage position;
   wherein the node in the first-part binary tree corresponding to the second-part binary tree without available resources is an edge node in the first-part binary tree,
   if resources of the allocated second-part binary tree are used up:
      when an idle node exists near the edge node, allocating two new second-part binary trees, dividing values of the second-part binary tree without the available resources into two parts and adding the two parts to the two newly allocated second-part binary trees respectively, and setting a value of the idle node to an intermediate value of the values of the second-part binary tree without the available resources, wherein the edge node and the idle node respectively point to the two newly allocated second-part binary trees; and
      when no idle node exists near the edge node, searching the first-part binary tree for two consecutive nodes, allocating two new second-part binary trees, dividing the values of the second-part binary tree without the available resources into two parts and adding the two parts to the two new second-part binary trees respectively, and setting values of the two consecutive nodes in the first-part binary tree to a value of the edge node and an intermediate value of the values of the second-part binary tree without full resources respectively, wherein the two consecutive nodes in the first-part binary tree point to the newly allocated two second-part binary trees through the pointers respectively.

2. The method according to claim 1, further comprising:
   adopting a resource management mode based on page tables and block tables for table entries with a same bit width, wherein page tables are adopted to implement page management for a virtual private network (VPN) with a small capacity, and block tables are adopted to implement block management for a VPN with a large capacity.

3. A device for storing table entries, wherein the device includes a central processing unit, comprising:
   an acquiring module, configured to acquire a storage position of a table entry in a hierarchical binary tree that comprises a first-part binary tree and second-part binary trees, wherein nodes of the first-part binary tree point to the second-part binary trees through pointers; and
   an inserting module, configured to insert the table entry to the hierarchical binary tree according to the storage position acquired by the acquiring module;
   wherein the inserting module further comprises:
      a first inserting sub-module, configured to allocate a node in the first-part binary tree and one of the second-part binary trees to a first table entry when inserting the first table entry to the hierarchical binary tree, wherein the allocated node in the first-part binary tree points to the allocated second-part binary tree through one of the pointers; and
      a second inserting sub-module, configured to insert table entries to the corresponding second-part binary tree through the pointer then continue to insert the table entries to the hierarchical binary tree according to the storage position;
   an allocating module, configured to allocate new second-part binary trees to the table entry when resources of the corresponding second-part binary tree are used up;
   wherein the allocating module comprises:
      a first allocating sub-module, configured to: allocate two new second-part binary trees when the node in the first-part binary tree corresponding to the second-part binary tree without available resources is an edge node and if an idle node exists near the edge node; divide values of the second-part binary tree without the available resources into two parts and add the two parts to the two new second-part binary trees respectively; set a value of the idle node to an intermediate value of the values of the second-part binary tree without the available resources; and point the edge node and the idle node to the newly allocated two second-part binary trees through the pointers respectively; and
      a second allocating sub-module, configured to: when no idle node exists near the edge node, search the first-part binary tree for two consecutive nodes; allocate two new second-part binary trees; divide the values of the second-part binary tree without the available resources into two parts and add the two parts to the two new second-part binary trees respectively; and set values of the two consecutive nodes in the first-part binary tree to a value of the edge node and an intermediate value of the values of the second-part binary tree without the available resources respectively, wherein the two consecutive nodes in the first-part binary tree point to the newly allocated two second-part binary trees through the pointers respectively.

4. A method for storing table entries, wherein the method is implemented by a central processing unit, comprising:
   acquiring a storage position of a table entry in a hierarchical binary tree that comprises a first-part binary tree and second-part binary trees, wherein nodes of the first-part binary tree point to the second-part binary trees through pointers; and
   inserting the table entry to the hierarchical binary tree according to the storage position;
   wherein before the inserting of the table entry to the hierarchical binary tree according to the storage position comprises:
      allocating a node in the first-part binary tree and one of the second-part binary trees to a first table entry when inserting the first table entry to the hierarchical binary tree, wherein the allocated node in the first-part binary tree points to the allocated second-part binary tree through one of the pointers; and
      inserting table entries to the allocated second-part binary tree through the pointer when continuing to insert the table entries to the hierarchical binary tree;

wherein the node in the first-part binary tree corresponding to the second-part binary tree without available resources is an intermediate node in the first-part binary tree, if resources of the corresponding second-part binary tree are used up:

when an idle node exists near the intermediate node, moving nodes between the idle node and the intermediate node in a table where the intermediate node is located one step toward the idle node in sequence, and moving pointers of the nodes between the idle node and the intermediate node in the table where the intermediate node is located accordingly in sequence so that a next node of the intermediate node is idle; allocating two new second-part binary trees; dividing values of the second-part binary tree without the available resources into two parts and adding the two parts to the two new second-part binary trees respectively; and setting a value of the next node of the intermediate node to an intermediate value of the values of the second-part binary tree without the available resources, wherein the intermediate node and the next node of the intermediate node point to the two newly allocated second-part binary trees through the pointers respectively; and when no idle node exists near the intermediate node, searching for an area of consecutive nodes in the first-part binary tree; moving all the nodes in the table where the intermediate node is located to the area of consecutive nodes in the first-part binary tree; moving the pointers of all nodes in the table where the intermediate node is located accordingly in sequence so that the intermediate node and the next node of the intermediate node after the movement are idle; allocating two new second-part binary trees; dividing the values of the second-part binary tree without the available resources into two parts and adding the two parts to the two new second-part binary trees respectively; and setting values of the intermediate node and the next node of the intermediate node to the value of this intermediate node and an intermediate value of the values of the second-part binary tree without the available resources respectively, wherein the intermediate node and the next node of the intermediate node point to the two newly allocated second-part binary trees through the pointers respectively.

5. The method according to claim 4, further comprising: adopting a resource management mode based on page tables and block tables for table entries with a same bit width, wherein page tables are adopted to implement page management for a virtual private network (VPN) with a small capacity, and block tables are adopted to implement block management for a VPN with a large capacity.

6. A device for storing table entries, wherein the device includes a central processing unit, comprising:

an acquiring module, configured to acquire a storage position of a table entry in a hierarchical binary tree that comprises a first-part binary tree and second-part binary trees, wherein nodes of the first-part binary tree point to the second-part binary trees through pointers; and an inserting module, configured to insert the table entry to the hierarchical binary tree according to the storage position acquired by the acquiring module;

wherein the inserting module further comprises:

a first inserting sub-module, configured to allocate a node in the first-part binary tree and one of the second-part binary trees to a first table entry when inserting the first table entry to the hierarchical binary tree, wherein the allocated node in the first-part binary tree points to the allocated second-part binary tree through one of the pointers; and a second inserting sub-module, configured to insert table entries to the corresponding second-part binary tree through the pointer then continue to insert the table entries to the hierarchical binary tree according to the storage position;

an allocating module, configured to allocate new second-part binary trees to the table entry when resources of the corresponding second-part binary tree are used up;

wherein the allocating module further comprises:

a first allocating sub-module, configured to: move nodes between an idle node and an intermediate node in a table where the intermediate node is located one step toward the idle node in sequence, and pointers of the nodes between the idle node and the intermediate node in the table where the intermediate node is located accordingly in sequence when the node in the first-part binary tree corresponding to the second-part binary tree without available resources is an intermediate node in the first-part binary tree and if an idle node exists near the intermediate node, so that a next node of the intermediate node is idle; allocate two new second-part binary trees; divide values of the second-part binary tree without the available resources into two parts and add the two parts to the two new second-part binary trees respectively; and set the value of the next node of the intermediate node to an intermediate value of the values of the second-part binary tree without the available resources, wherein the intermediate node and the next node of the intermediate node point to the two newly allocated second-part binary trees through pointers respectively; and a second allocating sub-module, configured to: search for an area of consecutive nodes in the first-part binary tree when no idle node exists near the intermediate node; move all nodes in the table where the intermediate node is located to the area of consecutive nodes in the first-part binary tree; move pointers of all nodes in the table where the intermediate node is located accordingly in sequence so that the intermediate node and the next node of the intermediate node after the movement are idle; allocate two new second-part binary trees; divide the values of the second-part binary tree without available resources into two parts and add the two parts to the two new second-part binary trees respectively; and set values of the corresponding node and a next node of the corresponding node to a value of this intermediate node and an intermediate value of the values of the second-part binary tree without the available resources respectively, wherein the intermediate node and the next node of the intermediate node point to the two newly allocated second-part binary trees through the pointers respectively.

* * * * *